United States Patent [19]

Fogg, Jr. et al.

[11] Patent Number: 5,129,064
[45] Date of Patent: Jul. 7, 1992

[54] SYSTEM AND METHOD FOR SIMULATING THE I/O OF A PROCESSING SYSTEM

[75] Inventors: Richard G. Fogg, Jr.; Arturo M. de Nicholas; John C. O'Quin, III, all of Austin, Tex.

[73] Assignee: International Business Machines Corporation, Armonk, N.Y.

[21] Appl. No.: 576,081

[22] Filed: Aug. 27, 1990

Related U.S. Application Data

[63] Continuation of Ser. No. 151,123, Feb. 1, 1988, abandoned.

[51] Int. Cl.[5] ............................................. G06F 13/22
[52] U.S. Cl. ................................. 395/275; 364/280.8; 364/241.2; 364/941
[58] Field of Search ... 364/200 MS File, 900 MS File

[56] References Cited

U.S. PATENT DOCUMENTS

| | | | |
|---|---|---|---|
| 2,907,524 | 10/1959 | Cali | 364/900 |
| 4,031,517 | 6/1977 | Hirtle . | |
| 4,106,091 | 8/1978 | Hepworth et al. | 364/200 |
| 4,370,709 | 1/1983 | Fosdick . | |
| 4,400,769 | 8/1983 | Kaneda et al. | 364/200 |
| 4,438,492 | 3/1984 | Harmon, Jr. et al. | 364/200 |
| 4,470,111 | 9/1984 | Jenkins et al. | 364/200 |
| 4,638,423 | 1/1987 | Ballard . | |
| 4,695,945 | 9/1987 | Irwin . | |
| 4,799,148 | 1/1989 | Nishioka . | |
| 4,812,967 | 3/1989 | Hirosawa et al. | 364/200 |
| 4,843,541 | 6/1989 | Bean et al. | 364/200 |
| 4,860,190 | 8/1989 | Kaneda et al. | 364/200 |
| 4,885,681 | 12/1989 | Umeno et al. | 364/200 |
| 4,887,202 | 12/1989 | Tanaka et al. | 364/200 |
| 4,930,068 | 5/1990 | Katayose et al. . | |
| 4,975,836 | 12/1990 | Hirosawa et al. | 364/200 |

FOREIGN PATENT DOCUMENTS 0168034 1/1986 European Pat. Off. .

OTHER PUBLICATIONS

Graham, C., "Amiga's Trump Card: IBM PC Emulation", AmigaWorld, vol. 1, No. 2, Nov./Dec., 1985. pp. 34-35.
"SoftPC", Insignia Solutions, Inc., ISI SoftPC Data Sheet Rev., 3.0, Jan. 1987, 8 pages.
Warner, E., "Unix-Based Workstations to Run DOS", Info World, Jul. 6, 1987, p. 8.

Primary Examiner—Michael R. Fleming
Assistant Examiner—Christopher B. Shin
Attorney, Agent, or Firm—Marilyn D. Smith; Mark E. McBurney

[57] ABSTRACT

The system and method of this invention allows a simulated processor to receive an interrupt request from I/O devices. A simulated interrupt controller routine determines whether to post an interrupt to the simulated CPU. The simulated interrupt controller routine posts an interrupt to the simulated CPU by updating one byte, which is owned by the simulated interrupt controller, of a two byte halfword. The other byte is owned by the simulated CPU and is updated by the simulated CPU when its internal interrupt enabled state changes. Each byte of the two byte halfword is updated independently, but is loaded by the simulated CPU with only one instruction to determine if an interrupt should be acknowledged.

The simulated CPU minimizes the overhead of polling for an interrupt by performing a graph analysis of the instruction flow of control to determine the locations to poll for interrupts. The simulated CPU polls for an interrupt when an instruction transfers control dynamically, once around a loop, and when an instruction changes the interrupt enabled state of the simulated CPU.

4 Claims, 9 Drawing Sheets

MINIMIZING INTERRUPT POLLING (iAPX 286 INSTRUCTIONS)

```
SUBROUTINE:
0500:100        PUSH    AX
0500:101        PUSH    SI
   GET_ENTRY:                        # THIS IS THE TOP OF A LOOP
0500:102        MOV     AH, [SI]
0500:104        CO      AH, 0xFF
0500:107        JE      SET_CARRY
0500:109        CMP     AH, AL
0500:10B        JE      CLEAR_CARRY
0500:10D        ADD     SI,BX
0500:10F        JMP     GET_ENTRY    # CLOSES A LOOP, INTERRUPTS POLLED HERE
   CLEAR_CARRY:
0500:111        POP     AX
0500:112        POP     AX
0500:113        CLC
0500:114        RET                  # INTERRUPTS POLLED HERE
   SET_CARRY:
0500:115        POP     SI
0500:116        POP     AX
0500:117        STC
0500:118        RET                  # INTERRUPTS POLLED HERE
```

FIG. 7

ENABLING iAPX 286 INTERRUPTS (TRANSLATED INSTRUCTIONS)

```
SETB    FL_5, INTERRUPT.BIT    # SET THE INTERRUPT ENABLE FLAG
STC     IPC_4, L.IRQ           # INDICATE INTERRUPTS ARE ENABLED
```

FIG. 8

SUBROUTINE:                  130

⎛ MC32    T_1, AX_8
                 ⎜ MC23    T_1, AX_8
PUSH AX          ⎨ CAL16   SP_12,-2(SP_2)
                 ⎜ CAS     T_2, SS_6, SP_12)
                 ⎝ STH     T_1, 0(T_2)

⎛ MC32    T_1, SI_14
                 ⎜ MC23    T_1, SI_14
PUSH SI          ⎨ CAL16   SP_12,-2(SP_12)
                 ⎜ CAS     T_2, SS_6, SP_12
                 ⎝ STH     T_1, 0(T_2)

GET_ENTRY:

⎛ CAS     T_2, DS_7, SI_14
MOV AH, [SI]     ⎨ LC      T_1, 0(T_2)
                 ⎝ MC23    AX_8, T_1

⎛ EXTS    TY_5, TY_5
                 ⎜ CAU     TY_5, O_DIF.B(TY_5)
                 ⎜ LIS     OP_3, 0
CMP  AH, 0XFF    ⎨ MC32    OP_3, AX_3
JE               ⎜ CLI     OP_3, 0XFF
                 ⎜ CAL16   OP_3, 1(OP_3)
                 ⎜ CAU     OP_3, 0XFF00(OP_3)
                 ⎝ BEQ     SET_CARRY

⎛ EXTS    TY_5, TY_5
                 ⎜ CAU     TY_5, O_DIF_B(TY_5)
                 ⎜ LIS     OP_3, 0
CMP  AH, AL      ⎜ MC32    OP_3, AX_8
JE               ⎨ NILZ    T_1, AX_8, 0XFF
                 ⎜ S       OP_3, T_1
                 ⎜ MC03    OP_3, T_1
                 ⎝ BEQ     CLEAR_CARRY

ADD SI, BX       ( CA16    SI_14, BX_11

138 → LH     T_1, IRQ(IPC_4)
                  → EXTS   T_1, T_1
JMP GET_ENTRY       BNE    GET_ENTRY
                  → BX     INTERRUPT
              138 → CAL16  T_0, 0X0201

FIG. 9A

CLEAR_CARRY:

| | | |
|---|---|---|
| POP AX | CAS | T_2, SS_6, SP_12 |
| | LH | AX_8, 0(T_2) |
| | CAL16 | SP_12, 2(SP_12) |
| | MC13 | AX_8, AX_8 |
| | SRI | AX_8, 8 |
| POP AX | CAS | T_2, SS_6, SP_12 |
| | LH | AX_8, 0(T_2) |
| | CAL16 | SP_12, 2(SP_12) |
| | MC13 | AX_8, AX_8 |
| | SRI | AX_8, 8 |
| CLC | CLRBI | FL_5, 31 |
| | NIU0 | TY_5, TY_5, 0XFFF0 |
| RET (138) | LH | T_1, IRQ(IPC_4) |
| | CAS | T_2, SS_6, SP_12 |
| | LH | T_0, 0(T_2) |
| | EXTS | T_1, T_1 |
| | BEQ | RET_INTERRUPT |
| | XIL | T_1, T_0, PREVIOUS_IP1 |
| | BEQX | PREVIOUS_TARGET_1 |
| | CAL16 | SP_12, 2(SP_12) |
| | BALI | TLB_SEARCH |

SET_CARRY:

| | | |
|---|---|---|
| POP SI | CAS | T_2, SS_6, SP_12 |
| | LH | SI_14, 0(T_2) |
| | CAL16 | SP_12, 2(SP_12) |
| | MC13 | SI_14, SI_14 |
| | SRI | SI_14, 8 |
| POP AX | CAS | T_2, SS_6, SP_12 |
| | LH | AX_8, 0(T_2) |
| | CAL16 | SP_12, 2(SP_12) |
| | MC13 | AX_8, AX_8 |
| | SRI | AX_8, 8 |
| STC | SETBI | FL_5, 31 |
| | NIU0 | TY_5, TY_5, 0XFFF0 |
| RET (138) | LH | T_1, IRQ(IPC_4) |
| | CAS | T_2, SS_6, SP_12 |
| | LH | T_0, 0(T_2) |
| | EXTS | T_1, T_1 |
| | BEQ | RET_INTERRUPT |
| | XIL | T_1, T_0, PREVIOUS_IP2 |
| | BEQX | PREVIOUS_TARGET_2 |
| | CAL16 | SP_12, 2(SP_12) |
| | BALI | TLB_SEARCH |

FIG. 9B

SYSTEM AND METHOD FOR SIMULATING THE I/O OF A PROCESSING SYSTEM

This is a continuation of application Ser. No. 07/151,123 filed Feb. 1, 1988, now abandoned.

CROSS-REFERENCE TO RELATED APPLICATIONS

U.S. patent application Ser. No. 820,451, filed Jan. 17, 1986 for a VIRTUAL TERMINAL SUBSYSTEM, currently co-pending, and assigned to the same assignee as the present invention.

U.S. patent application Ser. No. 07/151,136 having internal docket number AT9-88-002 filed Feb. 1, 1988 for a CONDITION CODE GRAPH ANALYSIS FOR SIMULATING A CPU PROCESSOR, currently co-pending, and assigned to the same assignee as the present invention, which is hereby incorporated by reference.

U.S. patent application Ser. No. 07/151,137 having internal docket number AT9-88-006 filed Feb. 1, 1988 for a TRANSLATING A DYNAMIC TRANSFER CONTROL INSTRUCTION ADDRESS IN A SIMULATED CPU PROCESSOR, currently co-pending, and assigned to the same assignee as the present invention, which is hereby incorporated by reference.

U.S. patent application Ser. No. 07/151,135 having internal docket number AT9-88-007 filed Feb. 1, 1988 for a MEMORY MAPPING AND SPECIAL WRITE DETECTION IN A SYSTEM AND METHOD FOR SIMULATING A CPU PROCESSOR, currently co-pending, and assigned to the same assignee as the present invention, which is hereby incorporated by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to data processing systems running applications written for the specific first processor of the first processing system having input/output devices, and more particularly to a system and method of simulating the I/O interrupts of the first processing system for running the applications on a second processing system having a second dissimilar processor and having the input/output devices of the first processing system attached to the second processing system.

2. Description of the Related Art

Current advances in computer technology have lead to ever changing processors, otherwise referred to herein as the central processing unit (CPU), of the processing system. Examples of the evolution of various processors are Intel's 8088 processor used in the IBM PC, Intel's 80286 processor used in the IBM PC AT, Intel's 80386 processor used in the IBM Personal System/2 model 80, and the IBM Research/ OPD Microprocessor (ROMP) which utilizes a Reduced Instruction Set Computer (RISC) architecture in the IBM RT PC. Other processors include Motorola's 68000, 68020 among others.

The hardware of various processing systems changes rapidly to take advantage of the increased processing power of emerging processors. A disadvantage of changing hardware is that the software written for previous processors typically can not be used on the later hardware technology. In some cases where it can be used on a different processing system other than the one it was originally written for, the performance of the application is not as good on the different processing system as it would have been on the processing system for which the application was originally written. As a result, software applications which may have had a long development cycle may become quickly obsolete. The demise of the earlier written software is all the more tragic when the function of the application as originally written is still very much pertinent and in demand on the new hardware processing systems.

As a result, there is typically only a limited amount of "new" software available that is specifically written for the "new" hardware design when the new hardware is initially released into the market place. This is due in part by the long development cycle of creating software application programs, and the confidentiality of the new hardware design by the manufacturer prior to releasing the hardware into the market place. The software manufacturer has to know certain facts about the hardware of a processing system before a software application program can be written for the processing system.

Ideally, a manufacturer of processing systems would like to have a vast amount of software available to run on the processing system as soon as the new hardware for the processing system is announced into the market place. A customer would more likely invest in a new processing system if the customer knows that an abundant supply of software is already available for use.

There have been several approaches in tapping the vast amount of software that has previously been written for "older" hardware designs. A previous hardware approach for being able to run applications originally written for another processor is to build the new processing system with a coprocessor. In this way, the processing system can run applications for both types of processors, the new processor and the old processor.

For example, the IBM RT PC contained an IBM PC AT coprocessor in order to use applications that were originally written for the IBM PC AT. However, since the coprocessor was supported at a low level in the operating system, the coprocessor could not take full advantage of the functions provided by the AIX operating system. One of the functions provided by the AIX operating system is multi-tasking as described in co-pending U.S. patent application Ser. No. 820,451, filed Jan. 17, 1986 for a VIRTUAL TERMINAL SUBSYSTEM and assigned to the same assignee as the present invention, which is herein incorporated by reference.

The coprocessor, however, limits the user to one session at a time, since the coprocessor included a hardware adapter for emulating the PC AT. In other words, once the coprocessor was started, no other instances of the coprocessor could be running. The coprocessor is also limited to the speed of the processor of the first processing system and cannot take advantage of faster second processing systems as they evolve.

A second approach is to simulate the second processor through software. A software simulator provides a mechanism to run previously written software for one processor on a new processing system having a different processor. A software approach to simulation allows taking advantage of faster second processing systems as they evolve. It allows the use of multasking capabilities of the operating system to provide multiple instances of the first processor.

Some software simulators on the market today include SoftPC, by Insignia Solutions, and the Amiga Transformer by Simile Research Inc. for Commodore's Amiga (based on Motorola's 68000). Information on this system was published in the article "Amiga's Trump Card: IBM PC Emulation", *AMIGA WORLD*, Vol. 1, No. 2, November/December 1985. Phoenix Technologies also provided a simulator to simulate the Intel processor for the Apollo machine which has a Motorola 68000 processor.

Any specific CPU processor has a specific instruction set. When a software application program is developed for a specific CPU processor, it is compiled into object code. The object code is targeted to run on any CPU that supports the specific instruction set. A simulator takes object code that was written to run on a specific instruction set, and converts it to run on a different processor which may have a similar or different instruction set. The more the two instruction sets of the two processors are different, the more difficult it is to simulate the other processor.

For example, the Intel 80286 processor has a very rich instruction set in that it provides a wide variety of instructions. Each instruction is tailored specifically for a particular type of situation. Additionally each instruction may be able to do several operations. In contrast, the ROMP processor in the RT PC has a reduced instruction set (RISC) processor which provides fewer instructions and less function per instruction. As each instruction in the Intel 80286 may be able to do several tasks, more instructions would be required with the ROMP RISC processor to accomplish the same tasks.

However, the speed of a processor can be increased by simplifying the instruction set. Although more instructions are required, no additional time is consumed on complicated instructions while executing the more common and simpler tasks.

Previous methods of software simulators created a subroutine that would simulate the effect of an instruction. Every time the machine being simulated needed to run that instruction, the subroutine would be called in order to decode and execute that instruction. The problem with this approach is that the overhead of decoding the instruction occurs every time the subroutine is called and executed. Consequently, the speed of the simulated processor is affected.

Instead of calling a subroutine each time an instruction needed to be executed, another software simulation approach compiled a shorter sequence of host machine instructions to simulate an instruction. As a result, the overhead of decoding and translating the instruction occurs only once, during the first time the instruction is encountered. This translation is then saved. From then on, every time that instruction is simulated, the translation is executed. This is often referred to as a second generation simulator. A first generation simulator will take an instruction one at a time and decode it in real time and execute it. The decoding is done for each instruction as each instruction is needed. A second generation simulator will go through the instructions one at a time, translate the instructions, and then reuse that translation instead of going back and translating again.

A previous second generation simulator was the simulator that simulated the ROMP CPU on the IBM System/370 called RSIM. This simulator reserves a fixed amount of storage for each instruction (16 bytes for every halfword) called cells. IBM 370 instructions would then be generated for each one of these cells for each RT instruction. If the amount of code generated is less than what would fit in one cell, which is usually the case, then it branches to the next boundary of the next cell. If the amount of code generated to simulate the instruction can not fit into one cell, then a subroutine call is generated that branches to a run time environment set of routines which perform the emulation and return back to the cell to complete execution. Another simulator simulates the processor of the IBM System/370 on the IBM RT PC which is described in the following article: May, C., "Mimic: A Fast System/370 Simulator", presented Jun. 11, 1987 at the Association of Computing Machinery Symposium on Interpreters and Interpretive Techniques", and published in SIGPLAN, 1987 proceedings of ACM.

A first generation simulator runs 50 to 100 host machine instructions per simulated instruction. A second generation simulator runs an average of 10 host machine instructions per simulated instruction.

If a simulator takes either 50 or 10 instructions to simulate one instruction on the simulated machine, the second processor running the simulator must be either 50 or 10 times as fast respectively as the simulated machine to be comparable in performance. It is therefore desirable to further reduce the number of simulator instructions per each simulated or translated instruction than what has previously been accomplished in the art.

For example, if a simulator could be designed to use only 4 instructions per simulated instruction, and the simulator processor is more than 4 times faster than the simulated machine processor, the simulator will be faster than the original machine being simulated. A user would then observe increased performance by using the simulated machine to run an application program than by using the machine for which the application program was originally written.

Therefore, the overall problem to overcome in simulating another processor is to further reduce the number of simulator (host) instructions per simulated instruction in order to increase the processing speed of the simulator.

However, if an application program which was written for a different processing system is to be executed, there is more than just the CPU processor that needs to be simulated efficiently. One major area in simulating a different processing system involves simulating accurately and efficiently the various aspects of the I/O of the first processing system while also simulating the processor of that first processing system. It is important not to degrade the performance of the CPU simulator while simulating I/O devices attached to the processing system. This is especially true when attempting to simulate an interrupt from an I/O device.

One major problem in using a software simulated CPU is in getting hardware interrupts from a physical adapter to the software simulated CPU without degrading its performance.

SUMMARY OF THE INVENTION

It is therefore an object of this invention to reduce the average host machine instructions per simulated machine instruction.

It is a further object of this invention to simulate a processing system and respond to interrupts presented by an I/O adapter on the processing system in a timely fashion without degrading performance of the simulator.

The simulator of this invention provides a path for the simulator to have direct control of the hardware. Several techniques were developed in order to accurately simulate the I/O of one processing system on a simulated processor of another processing system.

First, a technique was needed to simulate a typical hardware interrupt mechanism of a first processing system in order for the simulated CPU to recognize and service a hardware interrupt from an adapter. The simulated interrupt controller routine of this invention achieves this.

Although the Intel 80286 processor, which is being simulated in the preferred embodiment of this invention, cannot be interrupted as it is executing an instruction, the interrupt can come in and be recognized and serviced after each instruction. On a processing system simulator, it would be very time consuming to look for an interrupt after each instruction is executed, and then service the interrupt if the interrupt were pending.

The method of this invention minimizes the number of times an interrupt is polled by the simulated CPU while still guaranteeing the interrupts will be recognized in a timely fashion. Instead of checking for interrupts after each instruction, they are checked after a block of code (i.e. instructions). The method of this invention defines the blocks of instructions by a technique previously applied to compiler technology, and now applied to I/O simulation.

A graph analysis of the processor's flow of instruction control for the application program is used to determine blocks of first processor instructions that can be easily and readily translated together into several second processor instructions. After the end of a block of instructions, the simulated interrupt controller is checked to verify whether an interrupt is pending.

In addition, the CPU simulator has to guarantee that it will recognize an interrupt in a timely fashion to be responsive to the I/O devices. This means that it will have to poll for this interrupt at regular intervals in order to determine whether an interrupt is coming in.

To guarantee this, the simulator of this invention will check for interrupts when it detects, at the time it translates a block of instructions from the graph analysis, a possibility of a loop occurring in the program. A loop is an instruction that branches back to a place where it has already been before, and there is a path back to the branching instruction. Since it cannot be determined how long the simulator will be executing in the loop, it is guaranteed that every time around the loop the simulator will look for an interrupt.

The processor will recognize an interrupt when two conditions are true. One is when there is an interrupt being requested, in this case from the interrupt controller. The other is when internally the processor is able to service the interrupt.

In order for a simulator to recognize an interrupt, when both of these conditions are true, and to minimize the overhead in detecting an interrupt, the simulator polls a halfword, which is two bytes of memory, with a single Load Half word instruction. Each of the bytes of the halfword has a separate meaning. One byte indicates whether the processor is currently enabled to service interrupts. This byte is only updated by the simulated processor. The other byte indicates whether an interrupt is being requested. This byte only gets updated by the simulated interrupt controller. If both bytes are zero, it means that the processor is enabled for interrupts and that an interrupt is being requested. These two conditions can be updated separately, and yet checked simultaneously by a single instruction.

BRIEF DESCRIPTION OF THE DRAWING

FIG. 7 illustrates the location for polling for interrupts in a first processor instruction flow of control to minimize the overhead in polling for interrupts.

FIG. 8 illustrates translated instructions used to enable interrupts in the simulated processor.

FIG. 9A and 9B illustrate the flow of control of second processor instructions translated from the graph analysis of FIG. 3.

DESCRIPTION OF THE PREFERRED EMBODIMENT

In the preferred embodiment of this invention, the IBM RT PC simulates the IBM PC AT. An advantage of this preferred embodiment is that both the RT PC and the PC AT have an equivalent bus that allows adapters that were made for the PC AT to be used in the RT PC, if the system has the software to drive the adapters. To simulate a processing system that had a different bus, a virtual interface would have to be written to the hardware. In the present invention, there is direct interface to the hardware.

For example, in the preferred embodiment of this invention, a music card designed for the PC AT can be connected to the RT PC. Even though there is no native software for the RT that will drive the music card, the software that was written for the music card on the PC AT could be used on the RT PC by using the simulator of this invention.

For more information on the RT PC processing system, the IBM PC AT processing system, and Intel's 80286 processor, the following references are suggested, and are hereby incorporated by reference. Bach, M. J. *The Design of the UNIX Operating System*, Prentice Hall, 1986. Lang, T. G. and Mothersole, T. L., *Design of the RT PC VRM Nucleus*, Sep. 1, 1986. *AIX Operating System Commands Reference*, Version 2.1, IBM Corporation, SC23-0790. *AIX Operating System Managing the AIX Operating System*, Version 2.1, IBM Corporation, SC23-0793. *AIX Operating System Programming Tools and Interfaces*, Version 2.1, IBM Corporation, SC23-0789. *AIX Operating System Technical Reference*, Version 2.1, Volumes 1 and 2, IBM Corporation, SC23-0808 and SC23-0809 *IBM RT Personal Computer Technology*, IBM Corporation, SA23-1057, 1986. *Virtual Resource Manager Technical Reference*, Vesion 2.1, Volumes 1 and 2, IBM Corporation, SC23-0816 and SC23-0817. *iAPX 8286 Programmer's Reference Manual Including the iAPX 286 Numeric Supplement,* Intel, 210498-003, 1985. *IBM PC AT Technical Reference Manual,* IBM Corporation, March 1984. *8259A Programmable Interrupt Controller* 8259A/8259A-2/8259A-8, Intel, order number 231468-001, October, 1986.

Figure 1:
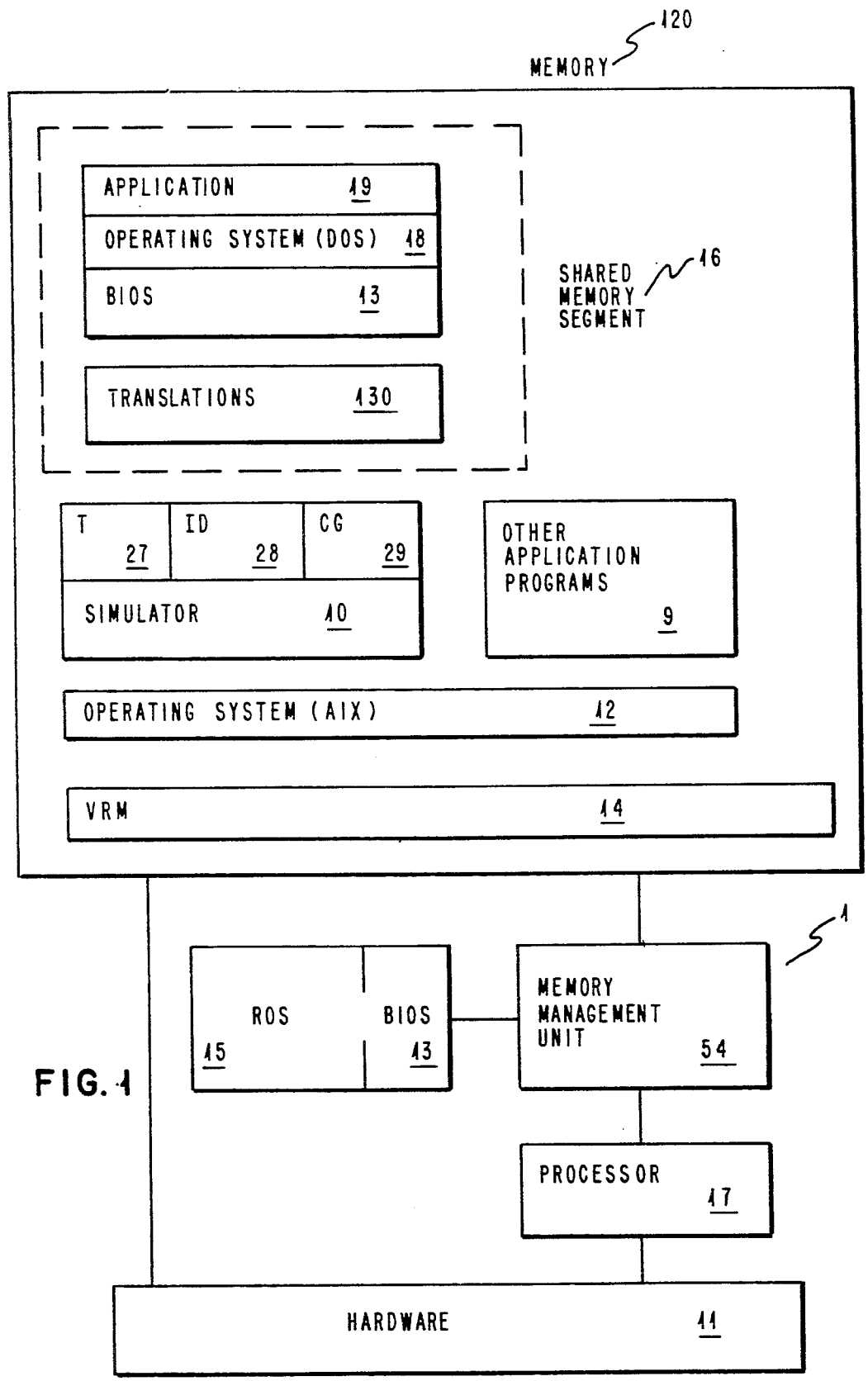
FIG. 1 is a block diagram showing the processing system environment of the preferred embodiment of this invention.
Figure 2:
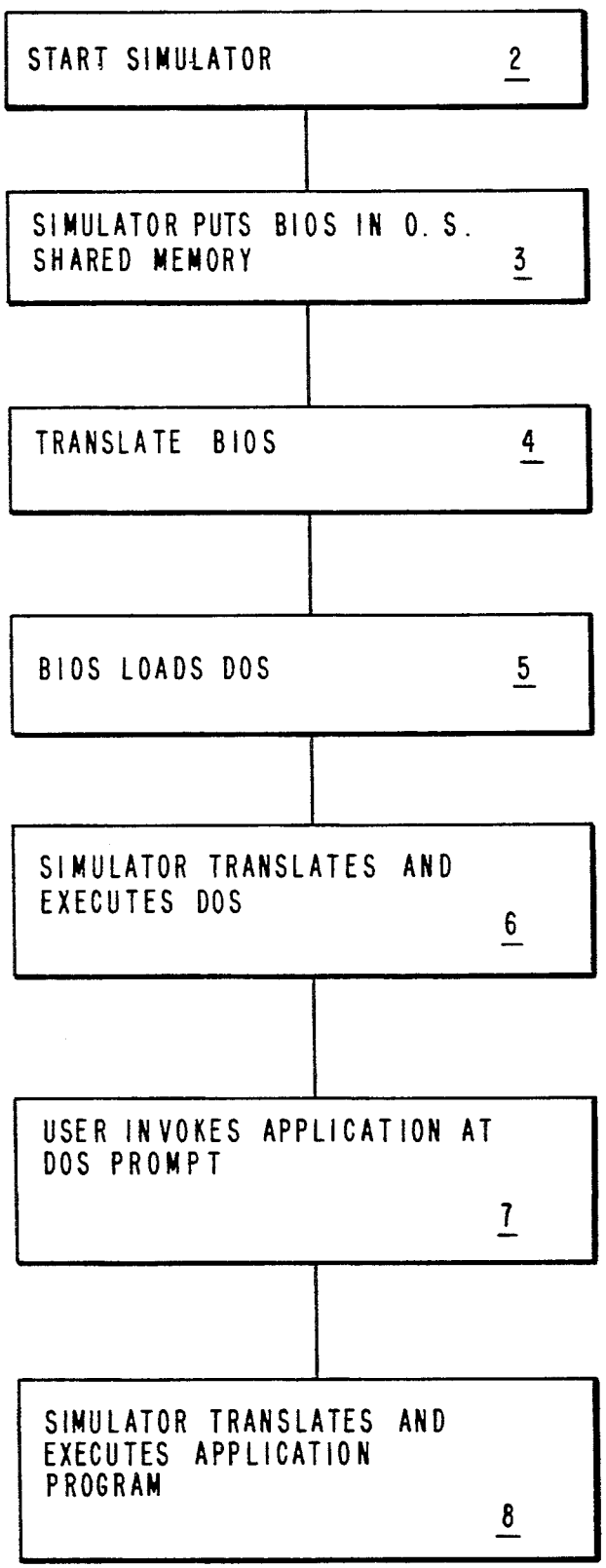
FIG. 2 is a flow chart showing the initial steps in starting the simulator of this invention.

As shown in FIG. 1, the simulator 10 runs as an application program on the operating system 12 of the processing system 1. Referring to FIG. 2 in addition to FIG. 1, as the simulator 10 is started, step 2, the simulator 10 copies BIOS 13 containing 80286 instructions from read only storage (ROS) 15, otherwise referred to as read only memory (ROM), into the operating system's 12 shared memory segment 16, step 3. The simulator 10 translates the BIOS 13, step 4, which loads the operating system (DOS) 18 for which the application 19 was originally written, step 5. The simulator 10 then translates and executes that operating system 18, step 6. A user invokes the application 19 at the operating system prompt, step 7, and the simulator 10 translates and executes the application program 19, step 8.

I. Interrupt Mechanism

Figure 5:
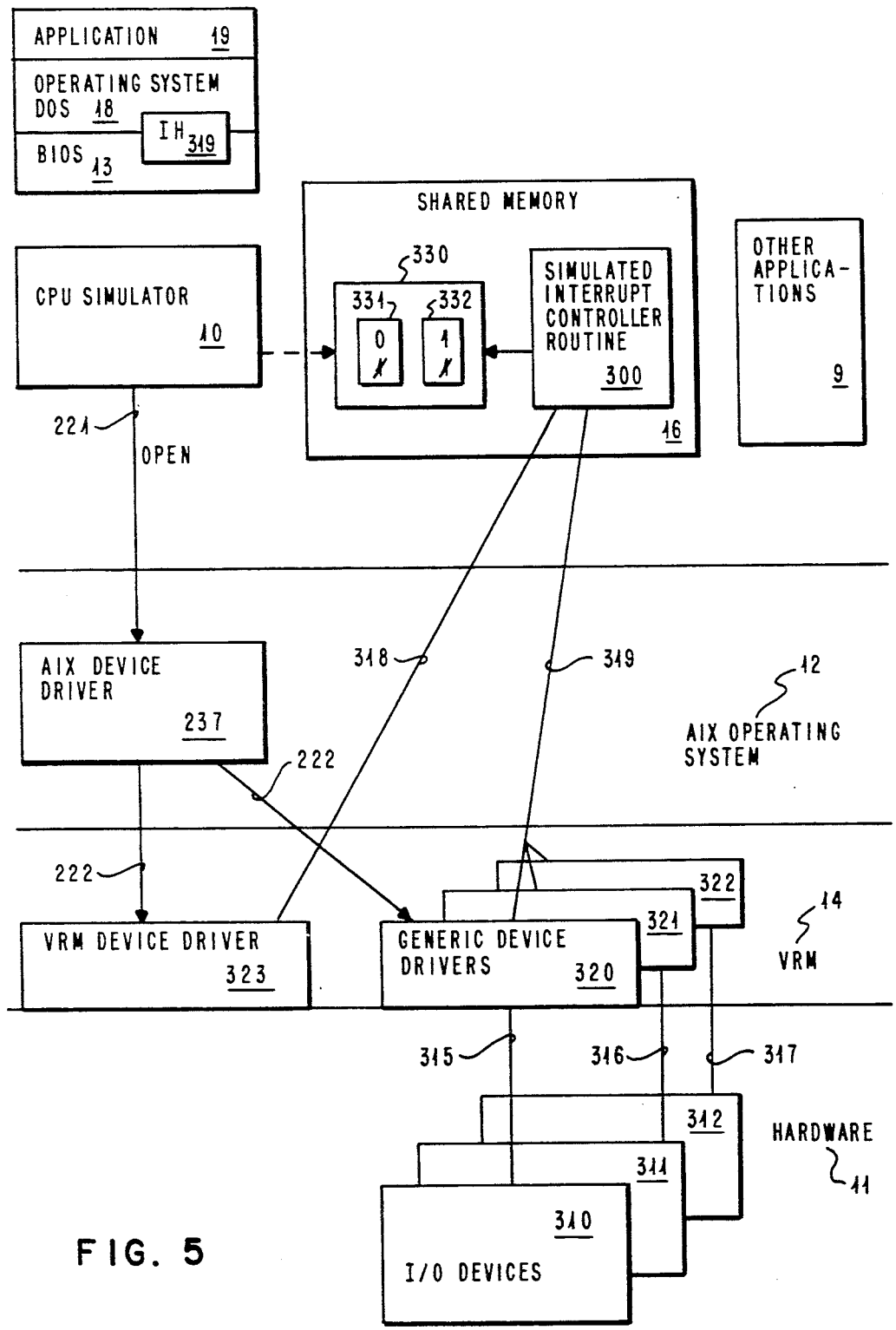
FIG. 5 is a block diagram of the system of this invention showing a simulated processor receiving interrupts from I/O devices.

In the preferred embodiment of this invention FIG. 5, a simulated interrupt controller routine 300 simulates the functions of a hardware interrupt mechanism, such as the Intel 8259, in order for a simulated CPU 10 to recognize and service a hardware interrupt from an adapter 310.

The CPU simulator 10 can only receive one interrupt at a time since it is simulating the 286 processor which only allows one interrupt request to come in. In a first processing system having a 286 processor, which the preferred embodiment of this invention is simulating, a hardware interrupt controller, called the 8259, was used to allow the 286 processor to receive only one interrupt, although 15 different levels of interrupts could be connected to internal adapters, such as the internal timer clock, or to external adapters, such as a communications card attached to the bus.

In order to prioritize these interrupts, the first processing system actually utilized two 8259 interrupt controllers with one cascaded into the other. Each of the interrupt controllers can receive eight inputs and prioritize them to one output. One interrupt controller receives eight interrupts from external or internal adapters, and prioritizes them into one output. The other interrupt controller receives this one output as one of the interrupts along with seven other possible interrupts from external or internal devices.

Additional information on this controller can be found in *8259A Programmable Interrupt Controller* 8259A/8259A-2/8259A-8, Intel, order number 231468-001, October, 1986, which is herein incorporated by reference. The function of the above hardware interrupt controller is emulated in the system of this invention in the simulated interrupt controller routine 300 (FIG. 5) by utilizing the above reference with standard programming skills known in the art.

The simulated interrupt controller routine 300 is located in a shared memory segment 16 (FIG. 5) which allows applications and other processes 10, 9, and device drivers 320 (functioning as interrupt handlers) access to the emulated functions of the interrupt controller. The simulated interrupt controller routine 300 was written to be re-entrant in order for the routines to be called without synchronization by other processes.

FIG. 5 illustrates the preferred embodiment used by this invention to present actual hardware interrupts 315, 316, 317 to the CPU simulator 10, which is an application running on the operating system 12.

First, a virtual resource manager (VRM) device driver 320-322 for each of the I/O devices 310-312 was installed in the virtual resource manager 14 to actually receive the hardware interrupts 315-317 from the hardware bus. Because a VRM device driver 320-322 was added, an AIX operating system device driver 237 was needed at the AIX operating system 12 Kernel.

The simulator 10 issues an OPEN command 221 to the operating system device driver 237 which does an attach 222 to the two types of device drivers 323, 320. The VRM device driver 323 is responsible for sending timer interrupts to the simulator 10. The capability of timer interrupts were needed at a granularity of less than one second. Timer interrupts of only one second are available at the AIX operating system level 12. However, at the VRM level 14, timer interrupts can be sent approximately every millisecond. Therefore, a VRM device driver 323 was used to present timer interrupts to the simulator 10.

The timer interrupt device driver 323 makes a call that sets a timer to receive periodic interrupts from the VRM 14. Each time a timer interrupt is received by the device driver 323 from the VRM 14, the device driver 323 calls the same interrupt controller simulation routine 300 to request an interrupt that the generic device driver 320 does when it receives an interrupt from the hardware 310. In this way, both timer interrupts 318 and hardware interrupts 319 can be sent to the simulator 10 which is running at the application level.

Figure 6:
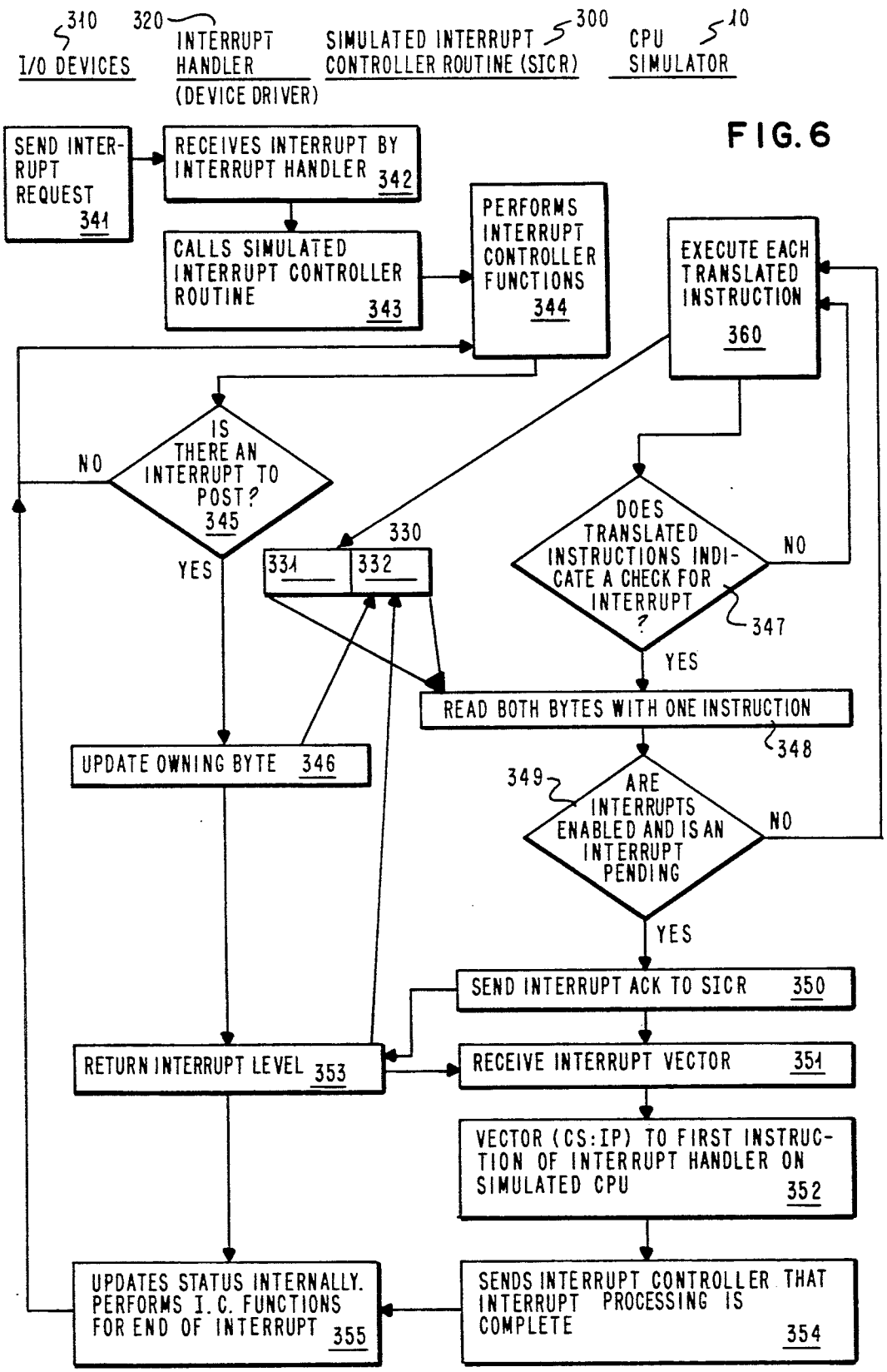
FIG. 6 is a flow diagram showing the method for a simulated processor to receive interrupts from I/O devices.

FIG. 6 illustrates the steps used by the system FIG. 5 of this invention to present actual hardware interrupts 315, 316, 317 to the CPU simulator 10.

When an adapter 310 such as a 3278/3279 emulation card sends a hardware interrupt, it is received by an interrupt handler in the device driver 320, steps 341 and 342. Once the device driver 320 recognizes the interrupt 315, the device driver 320 calls a routine, the simulated interrupt controller routine 300, step 343, which simulates the functions of a hardware interrupt controller, e.g. the 8259, step 344.

Some of these functions include checking the level of the interrupt, prioritizing the interrupts, and checking for masked and unmasked interrupts. For an example, an application 19 can disable different levels of interrupts by masking interrupts. If an application 19 does not support certain I/O devices, it will mask the interrupts from them. Therefore, the simulated interrupt controller routine 300 will determine if an interrupt can be posted to the CPU simulator on the level that the device driver 320 received the interrupt on, step 345. If it cannot, it waits for the next call from a device driver 320-323.

If the interrupt can be posted on the same level, a flag is set. When the simulated interrupt controller routine 300 has an interrupt to post to the CPU simulator 10, the routine 300 updates one byte 332, by setting it to zero, of a two byte word (or halfword) 330, step 346. When the halfword 330 becomes zero, there is an interrupt that needs to be serviced. In the two bytes of the halfword 330, the upper byte 332 is owned by the simulation of the interrupt controller 300, and the lower byte 331 is owned by the processor, i.e., the CPU simulator, or vice versa.

Most processors will recognize an interrupt when two conditions are true. One is that there is an interrupt being requested, in this case from the simulated interrupt controller routine. The other is that internally the processor is able to service the interrupt.

The CPU simulator can disable interrupts, as most processors can. Usually this happens when the processor is dealing with very sensitive data that cannot be inconsistent. If a routine is updating data that is also dealt with in interrupt handlers, the processor will disable interrupts to guarantee that a certain sequence of instructions will be executed automatically without being interrupted.

The processor indicates whether it can internally service an interrupt by updating the interrupt flag register in the processor. For the simulated instructions of this invention, some typical instructions used by the processor to disable and enable interrupts through the flags register are described as follows.

The CLI (clear interrupt) clears the interrupt enable bit in the flag register of the processor of first processing system being simulated to disable any interrupt requests from the interrupt controller. The STI (set interrupt) instruction sets the interrupt enable bit in the flag register to enable any interrupt requests from the interrupt controller. In addition, there are two instructions, IRET and POPF, which replace the entire contents of the flag register including the interrupt enable bit.

As the CPU simulator 10 executes a translation of any one of these instructions, step 360 (FIG. 6), it will reflect its interrupt enabling state through the byte 331 of the two byte halfword 330. FIG. 8 shows the translated code required to simulate the STI instruction. The first instruction shown in FIG. 8 illustrates the translation used for the STI instruction which enables the processor to service interrupt requests. The second instruction shown in FIG. 8 updates the byte 331 owned by the simulated processor to reflect the enabled state of the processor.

The CPU simulator 10 not only has to be able to recognize the fact that externally an interrupt action is being requested, but that internally the processor is able to service the interrupt. This is done by polling the two bytes 330 in the shared memory segment 16. The one byte 331 of the halfword 330 owned by the CPU would be zero if interrupts are enabled internally in the processor. The other byte 332 owned by the simulated interrupt controller routine 300 would be zero when an interrupt is being requested externally which is of high enough priority as determined by the current priority interrupt level of the simulated interrupt controller routine 300, step 344. The CPU simulator 10 regularly reads the two bytes 330, step 348, until the two bytes 330 become zero, step 349.

The system and method of this invention identifies key areas in the instruction flow of control of the application 19 in order to minimize the overhead of guaranteeing a responsive acknowledgement of an interrupt request. The two key areas in minimizing the overhead of checking for interrupts are 1. minimizing the number of places where interrupts are recognized, and 2. minimizing the amount of work required to determine if an interrupt should be serviced.

Figure 3:
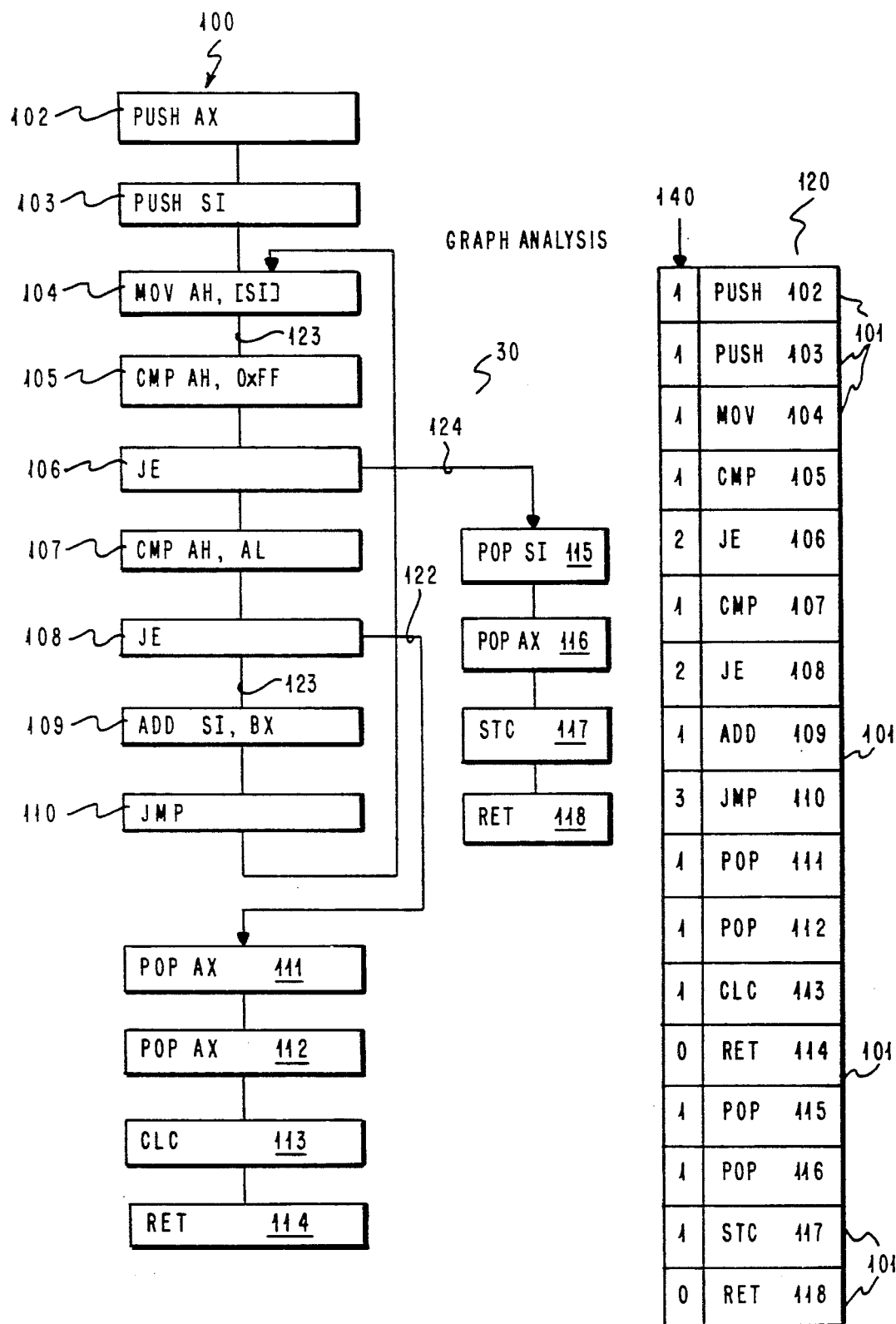
FIG. 3 is a graph analysis of a sample flow of control of first processor instructions that are to be translated.

The simulator 10 relies on information provided by a graph analysis 30, FIG. 3 of a block of first processor instructions 100 to determine where an interrupt request is to be polled in order to minimize the number of places where interrupts are recognized. Although, a graph analysis technique was previously applied in optimizing high level language compilers, it is believed that this is the first time that this technique has been applied to the problem of processor I/O simulation.

The simulator 10 translates first processor instructions 100 (FIG. 3) into second processor instructions 130 (FIG. 9A, 9B), but does not do the translating one instruction at a time. The simulator 10 examines the first instruction that is about to be executed, and for which there is no translation, and continues examining subsequent instructions while building a graph 30 of those instructions as shown in FIG. 3.

Figure 4:
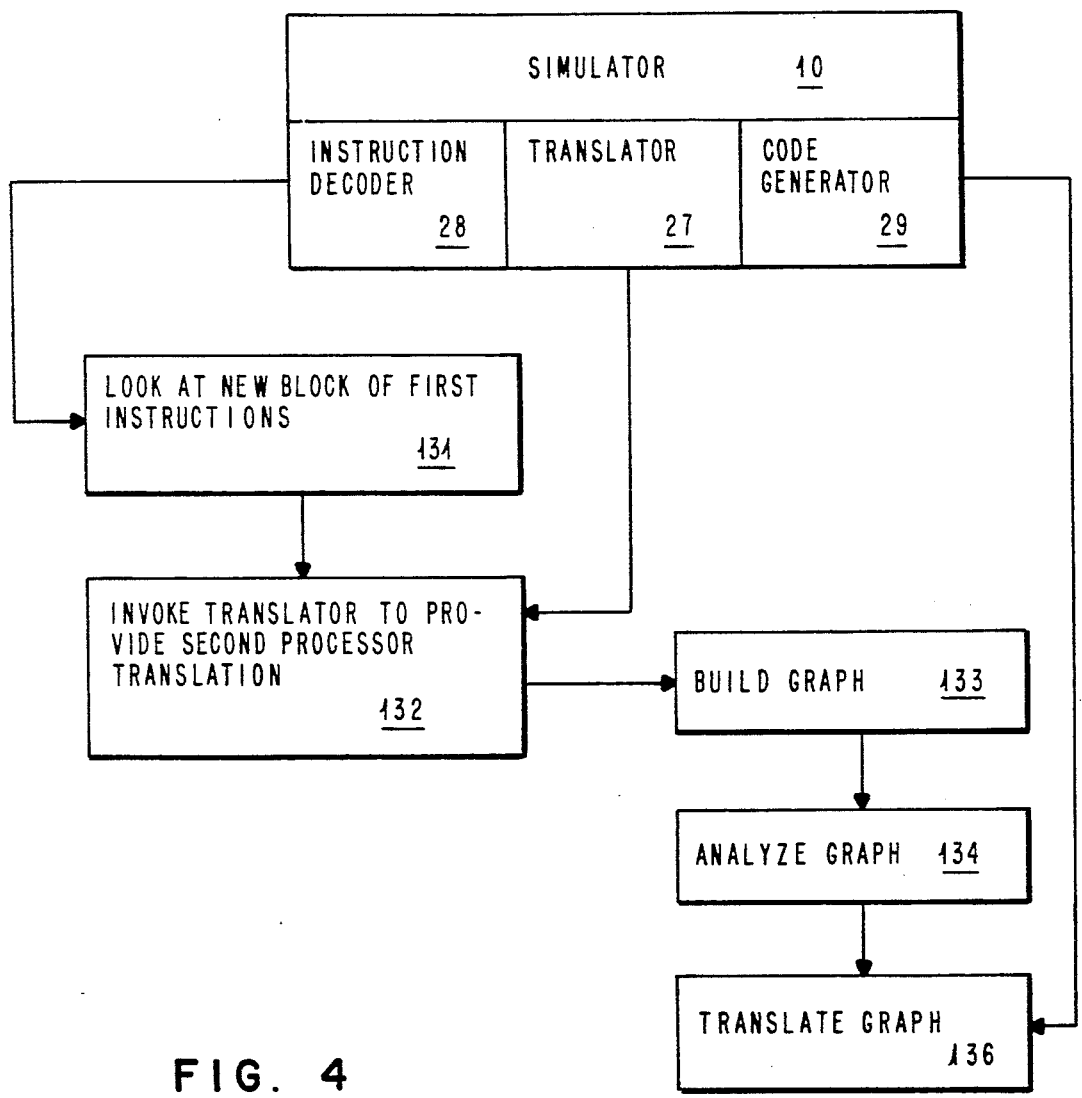
FIG. 4 is a flow diagram of the translation by the CPU simulator.

When the simulator 10 reaches a new block of first processor instructions 100, step 131, FIG. 4, the simulator 10 invokes the translator 27 to provide a second processor translation, step 132. The translation occurs in three phases.

First, a graph 30, FIG. 3, is built, step 133, FIG. 4, which represents the structure of the block of first processor instructions 100. Each node 101 in the graph corresponds to one instruction 100. A first processor instruction decoder 28 fills in each node 101 with information about the instruction 100 including the type 140 of instruction.

The instruction type 140 is dependant on the number of descendants of an instruction 100. Each node 101 can have at most two descendants. In the case of sequential instructions 102–105, 107, 109, 111–113, 115–117, which transfer control only to the next sequential instruction in memory, the nodes 101 have only one descendant 103–106, 108, 110, 112–114, 116–118, respectively, as shown in FIG. 3. There can be two descendants in the case of conditional branch instructions 106, 108, which test for a condition and branch to one instruction if the condition is true, and continues with the next instruction if the condition is false. It is possible for a node 101 to have no descendants, as is the case for the interrupt return instruction 114, 118. The instruction 114, 118 that has no descendants illustrates an instruction that transfers control dynamically. A node 101 can have one descendant that is not the sequential instruction. The unconditional jump instruction 110 is an example of this.

As shown above, there are four types of instructions 100. These types are numbered in the code as follows. A node 101 is numbered "0" if the instruction at the node has no descendents, i.e., the return instruction 118. A node 101 is numbered "1" if it is a sequential instruction and has one sequential descendent i.e., compare instruction 105. A node 101 is numbered "2" if the instruction has two descendents i.e., jump if equal instruction 106. A node 101 is numbered "3" if the instruction is not a sequential instruction, but has only one descendent, i.e. jump instruction 110.

The nodes 101 are allocated in storage 120 sequentially as the translator 27, step 133, FIG. 4, finds them. The search through the application program 19 originally written for the first processor is called a depth first search. The depth first search means that the instructions are searched sequentially until an instruction is reached that has already been visited and stored in memory, e.g. move 104, or an end node such as zero, e.g. the return instruction 114, is reached. If an instruction (e.g. move 104) is reached that has already been stored in memory, and that instruction has a path 123 to the instruction previously stored (e.g. jump 110), then a loop has been encountered, and is recorded in the previously stored instruction (e.g. jump 110).

The graph analysis then resumes the depth first search by visiting the previously encountered type 2 node (e.g. jump 108), and then searching sequentially along the alternate path 122 until an instruction is reached that has already been visited and stored in memory, or an end node such as zero, e.g. the return instruction 114, is reached. The depth first search reiterates the above process by visiting the previously encountered type 2 node (e.g. jump 108). If both paths 122, 123 of this instruction have already been followed, the search visits the next previous type 2 instruction (e.g. jump 106) and follows the alternate path 124. The instructions 115-118 are searched sequentially until an instruction is reached that has already been visited and stored in memory, or an end node such as zero, e.g. the return instruction 118, is reached.

Second, step 134, FIG. 4, the graph 30 is analyzed to determine where interrupts must be polled. An interrupt is polled just prior to all type 0 instructions. In addition, an interrupt is polled just prior to a type 1 instruction, if the type one instruction is a CLI (clear interrupt instruction). An interrupt is polled at a type 2 or 3 instruction only if that instruction closes a loop as determined during the depth first search of the graph analysis.

Third, step 136, FIG. 4, the code generator 29 is invoked to translate the graph 30 into second processor instructions, FIG. 9A, 9B. Where it has been determined from the graph analysis that an interrupt will be polled, the translator will insert translated code 138 that checks for an interrupt at that point, as shown in FIG. 9A, 9B.

As determined above by the graph analysis, interrupts are only checked when an instruction transfers control to a point that cannot be determined statically, (since it requires a value that is known only at run time), i.e., at a node type 0, or when a branch or conditional branch instruction closes a loop. As a further example, FIG. 7 illustrates in a first processing system instruction flow of control, the location for polling for interrupts in order to minimize the number of places where interrupts are recognized.

Not only should the number of places where interrupts must be polled be minimized, but the work required to determine if an interrupt should be serviced should also be minimized. Whether an interrupt request should be serviced depends on whether there is a pending interrupt request and whether the processor is currently enabled to service it.

The simulator of this invention utilizes a two byte halfword in a shared memory segment (in a page that is pinned) to indicate the current state of both the interrupt enable flag in the processor, and the incoming interrupt request.

The first byte in the halfword contains a zero when the processor is enabled to service interrupts. The second byte contains zero when an interrupt is being requested. The key is that these bytes can be updated automatically by using the STore Character instruction, and can be read simultaneously by using the Load Halfword instruction. This avoids synchronization problems that occur when a program in a critical section is interrupted and another process updates the same data resulting in an inconsistent state.

In the environment of the preferred embodiment, if the IBM RT PC is equipped with an Advanced Processor Card, execution of the Load Halfword instruction will be overlapped with other instructions resulting in further improvement in performance. If no interrupt is to be serviced, which is by far the most common condition then polling for interrupts costs about 4 machine cycles, about half a microsecond.

Referring to FIG. 6, the CPU simulator 10 regularly reads the two bytes 330, step 348, until the two bytes 330 become zero, step 349. When the two bytes becomes zero, the CPU simulator 10 sends an interrupt acknowledge, step 350, to the simulated interrupt controller routine 300. This simulates the mechanism in the hardware by which the processor tells the interrupt controller that it has acknowledged the fact that the hardware has requested an interrupt.

The simulated interrupt controller routine 300 returns the type of interrupt level, step 353, to the CPU simulator 10. The interrupt level information is passed by the simulated interrupt controller routine 300 in the form of an interrupt vector which indicates an address location in memory. The CPU simulator 10 receives this information, and goes to memory 16 and loads an address from that specified memory location to call an interrupt handler to process the interrupt. The interrupt handler processes IN and OUT instructions to the physical devices 11 to service the interrupt request. When the interrupt handler completes, it notifies the simulated interrupt controller 300, and the simulated interrupt controller updates its internal status and performs the interrupt controller functions for an end of interrupt, step 354, 355 FIG. 6.

The interrupt handler is part of the DOS 18 or BIOS 13 code that is used by the simulated processor. In this way, the CPU simulator 10 determined what needs to be done for each type of interrupt.

Although the foregoing invention has been particularly shown and described with reference to the preferred embodiments thereof, it will be understood by those skilled in the art that other changes in form may be made without departing from the scope of the invention.

We claim:

1. A system of simulating at least one interrupt request, originating from at least one I/O hardware device, comprising:

means for simulating a central processing unit capable of recognizing and servicing said I/O interrupt request;

means for simulating an interrupt controller and for receiving said interrupt request;

a first indicator, in communication with a updatable by said simulated interrupt controller, for indicating the presence of said interrupt request;

a second indicator, in communication with and updatable by said simulated processor, for indicating that said simulated processor is enabled to service said interrupt request;

means for graphically representing instructions from a program application running on said simulated processor;

means for determining when said simulated processor is to poll said first and second indicators by analyzing said graphically represented instructions to find a specific type of said graphically represented instruction that transfers control of said simulated processor to a previously analyzed one of said instructions; and means for inserting a poll indicator into said graphically represented instructions, prior to said specific instructions, that will cause said simulated processor to perform said poll upon encountering said poll indicator during execution of said instructions.

2. A system according to claim 1 wherein said specific instruction transfers control to a next sequential one of said instructions that clears said second indicator.

3. A method of simulating, on an information handling system having a memory, at least one interrupt request, generated by at least one I/O hardware device, such that said interrupt request can be serviced by a simulated processor, said method comprising the steps of:

simulating, by said information handling system, a hardware interrupt controller, for receiving said interrupt request;

indicating, in a two-byte segment of said memory, by said simulated interrupt controller, the receipt of said interrupt request and by said simulated processor an enabled state of said simulated processor to service said interrupt request;

determining, by said simulated processor, when to perform a poll of said two-byte memory segment by graphically representing instructions from a program application running on said simulated processor and analyzing said graphically represented instructions, prior to their execution, to find a specific type of said graphically represented instruction that transfers control of said simulated processor to a previously analyzed one of said instructions;

inserting, by said simulated processor, a poll indicator in said graphical representation prior to said specific instructions that will cause said simulated processor to poll said two-byte memory segment; and polling, by said simulated processor, of said two-byte memory segment, upon encountering said poll indicator, for the indication of said interrupt request during execution of said instructions.

4. A method according to claim 3 wherein said step of polling occurs when said specific instruction transfers control to a next sequential instruction which clears a portion of said two-byte memory segment that indicates the enabled state of said simulated processor.

* * * * *

UNITED STATES PATENT AND TRADEMARK OFFICE
CERTIFICATE OF CORRECTION

PATENT NO. : 5,129,064
DATED : July 7, 1992
INVENTOR(S) : Richard G. Fogg, Jr., Arturo M. de Nicholas and John C. O'Quinn III It is certified that error appears in the above-indentified patent and that said Letters Patent is hereby corrected as shown below:

Col. 12, line 47, delete "a", second occurrence, and insert --and--.

Signed and Sealed this

Fifteenth Day of October, 1996

Attest:

BRUCE LEHMAN

*Attesting Officer*     *Commissioner of Patents and Trademarks*